United States Patent
Borgmeier et al.

(10) Patent No.: US 6,883,779 B2
(45) Date of Patent: Apr. 26, 2005

(54) RECEIVING PART OF A FLUID PLUG-IN COUPLING

(75) Inventors: Olav Borgmeier, Hückeswagen (DE); Frank Zenses, Hürth (DE); Jannis Serdaris, Gummersbach (DE); Norbert Terlau, Kürten (DE); Reiner Mitterer, Wipperfürth (DE)

(73) Assignee: Voss Automotive GmbH, Wipperfurth (DE)

( * ) Notice: Subject to any disclaimer, the term of this patent is extended or adjusted under 35 U.S.C. 154(b) by 18 days.

(21) Appl. No.: 10/657,604

(22) Filed: Sep. 8, 2003

(65) Prior Publication Data

US 2004/0178379 A1 Sep. 16, 2004

(30) Foreign Application Priority Data

Sep. 9, 2002 (DE) ..................................... 202 13 961 U

(51) Int. Cl.[7] ............................................... B65B 1/04
(52) U.S. Cl. ..................... 251/149.6; 285/319; 285/93
(58) Field of Search ..................... 251/149.6; 285/93, 285/316, 319, 320

(56) References Cited

U.S. PATENT DOCUMENTS

| | | | |
|---|---|---|---|
| 2,237,611 A | | 4/1941 | Scheiwer |
| 4,979,765 A | | 12/1990 | Bartholomew |
| 5,178,424 A | * | 1/1993 | Klinger ..................... 285/319 |
| 5,228,728 A | * | 7/1993 | McNaughton et al. ...... 285/319 |
| 6,557,904 B1 | * | 5/2003 | Naito ......................... 285/316 |

FOREIGN PATENT DOCUMENTS

| | | |
|---|---|---|
| DE | 240 059 | 10/1986 |
| DE | 35 20 161 | 12/1986 |
| DE | 195 11 063 | 11/1995 |
| DE | 105 20 099 | 1/1997 |
| DE | 105 26 316 | 1/1997 |
| DE | 197 42 917 | 5/1999 |
| EP | 0 308 160 A1 | 3/1989 |
| EP | 0 926 415 | 6/1999 |
| EP | 0 727 027 | 12/1999 |
| EP | 1 054 203 | 11/2000 |
| GB | 2 174 163 A | 10/1986 |

* cited by examiner

Primary Examiner—Steven O. Douglas
(74) Attorney, Agent, or Firm—Brinks Hofer Gilson & Lione

(57) ABSTRACT

A receiving part of a fluid plug-in coupling is provided, including a socket housing having a plug-in opening for a plug part and having a retaining device for releasably fixing the plugged-in plug part in place. The retaining device has a retaining element mounted in the socket housing and radially elastically deformable retaining sections for latching engagement behind a radial retaining step of the plug part. A release element is secured in an axially displaceable manner relative to the socket housing via latching means. The release element engages by means of an inner release section the plug-in opening and acts against the retaining sections of the retaining element. A securing element is provided such that the release element is blocked in a secured position agains a release movement and is unblocked in an unblocked position for a release movement. The securing element and the release element are preferably rotatable about the coupling axis relative to each other between the secured position and the unblocked position.

16 Claims, 5 Drawing Sheets

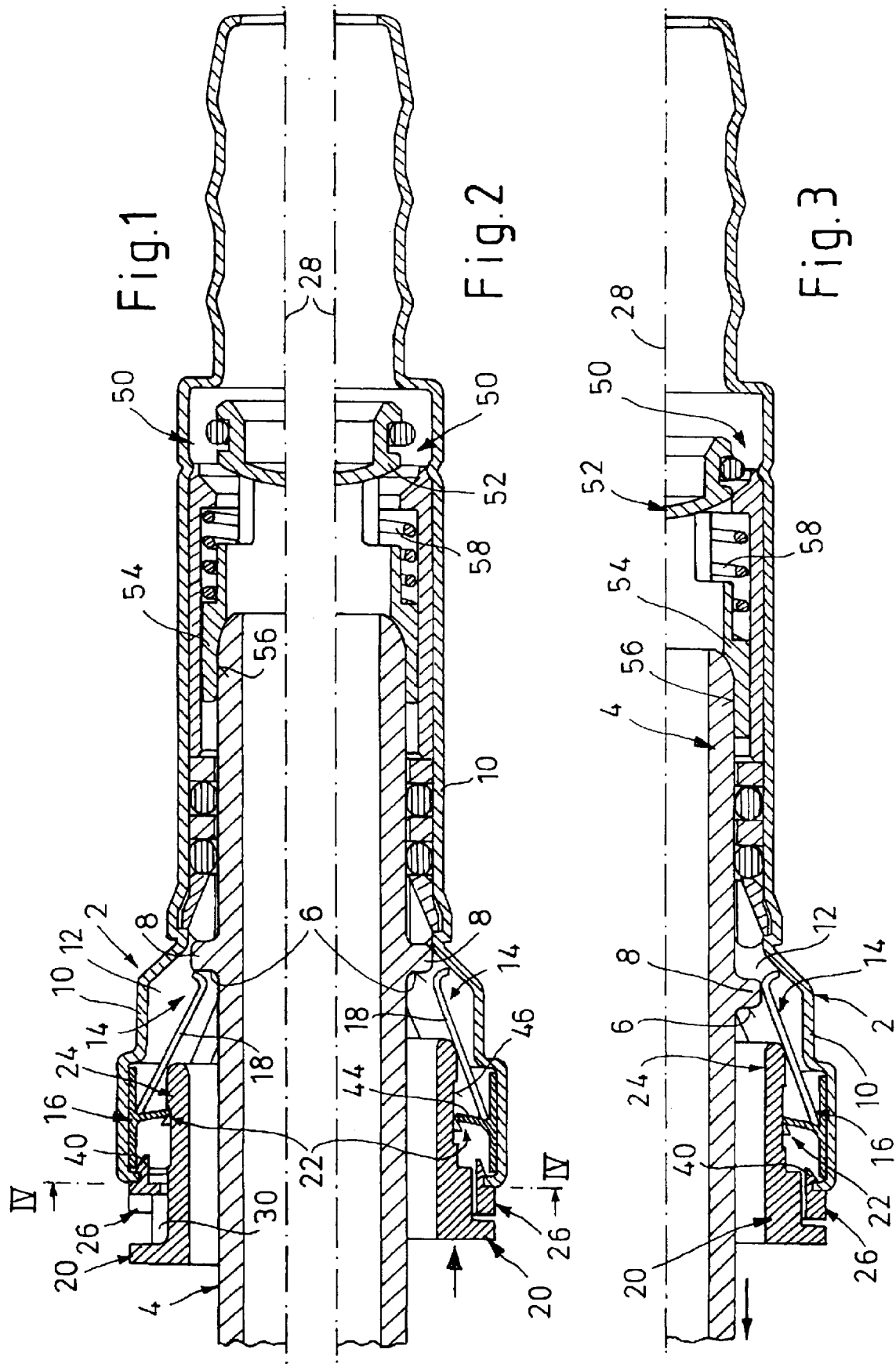

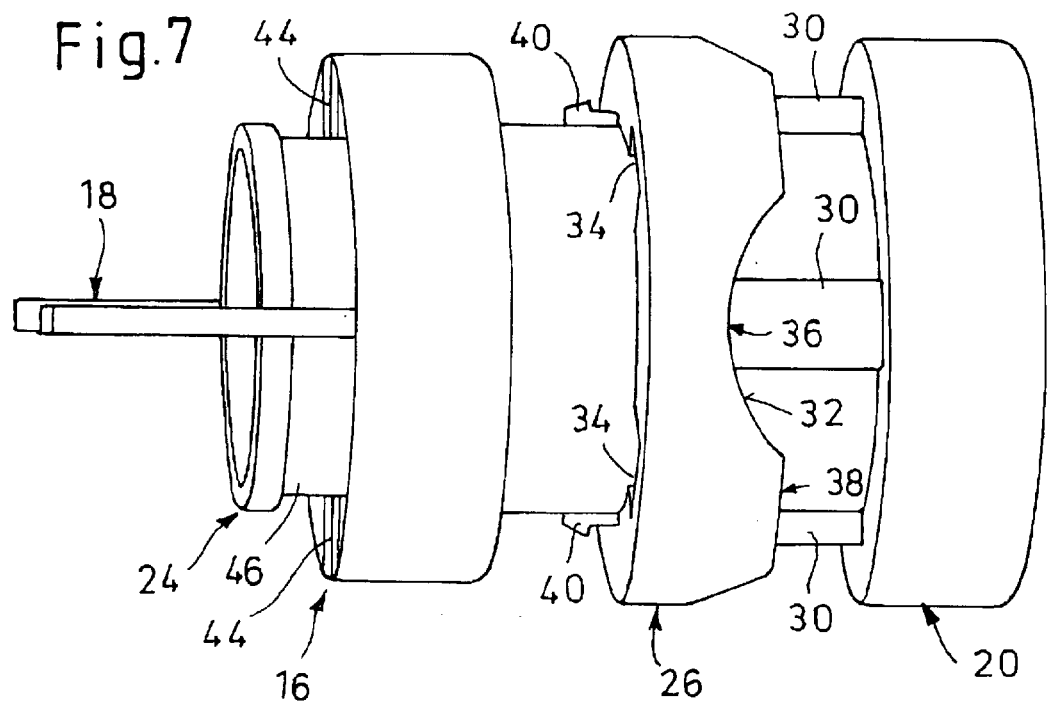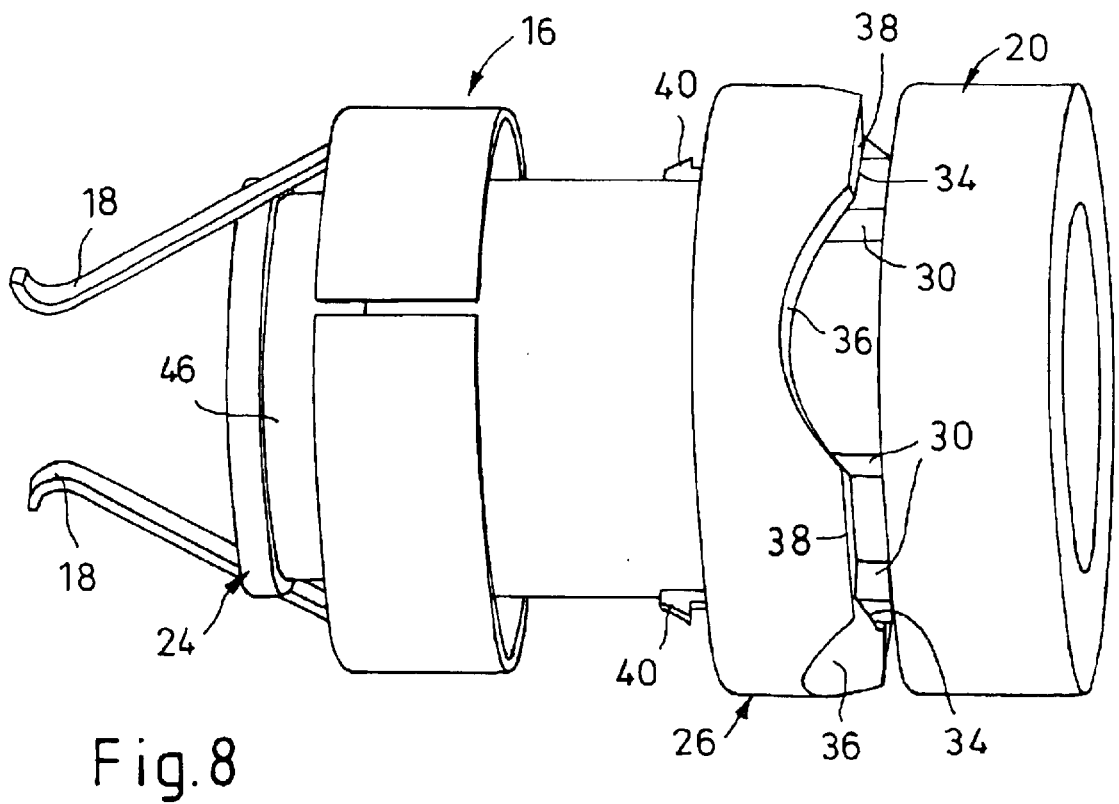

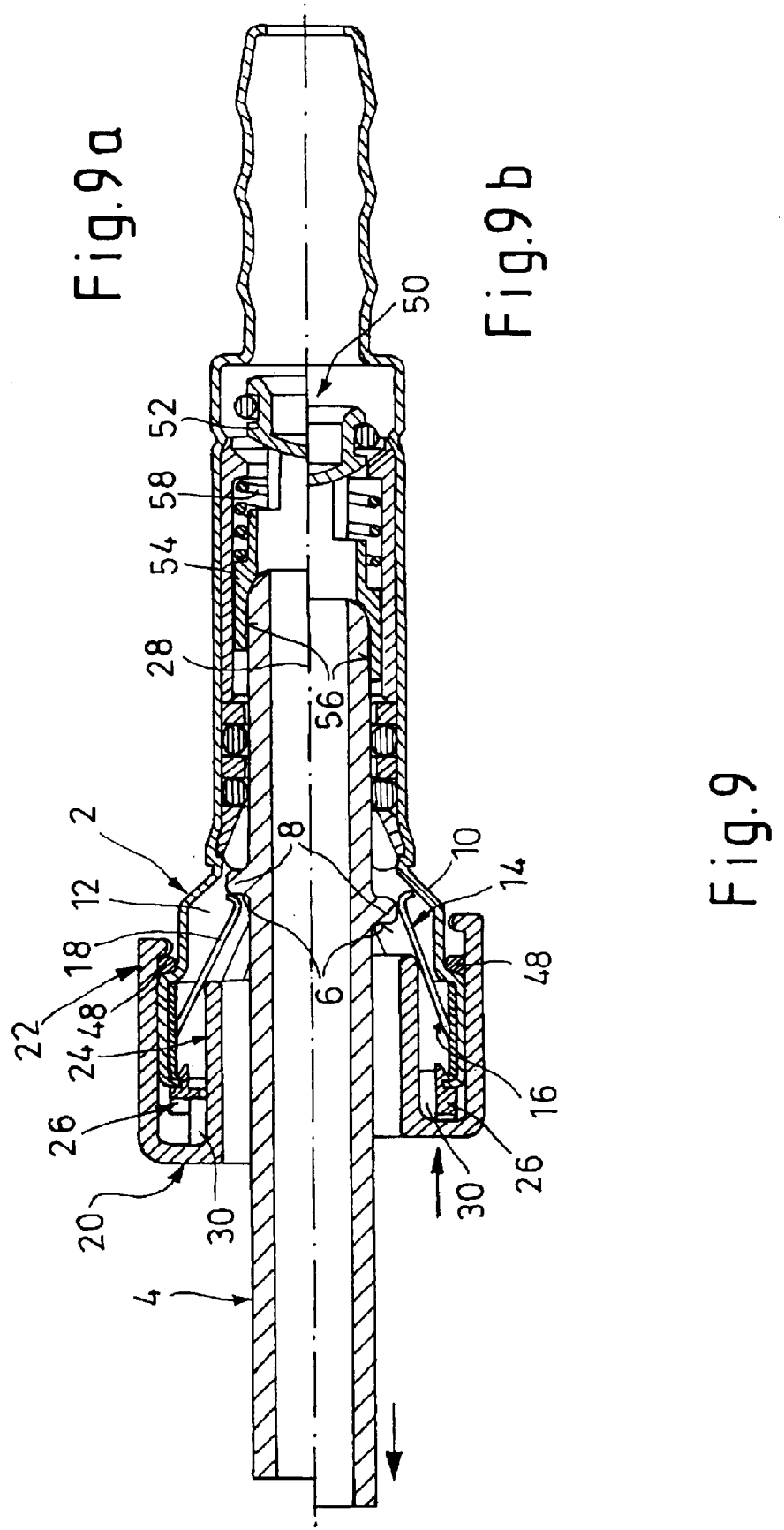

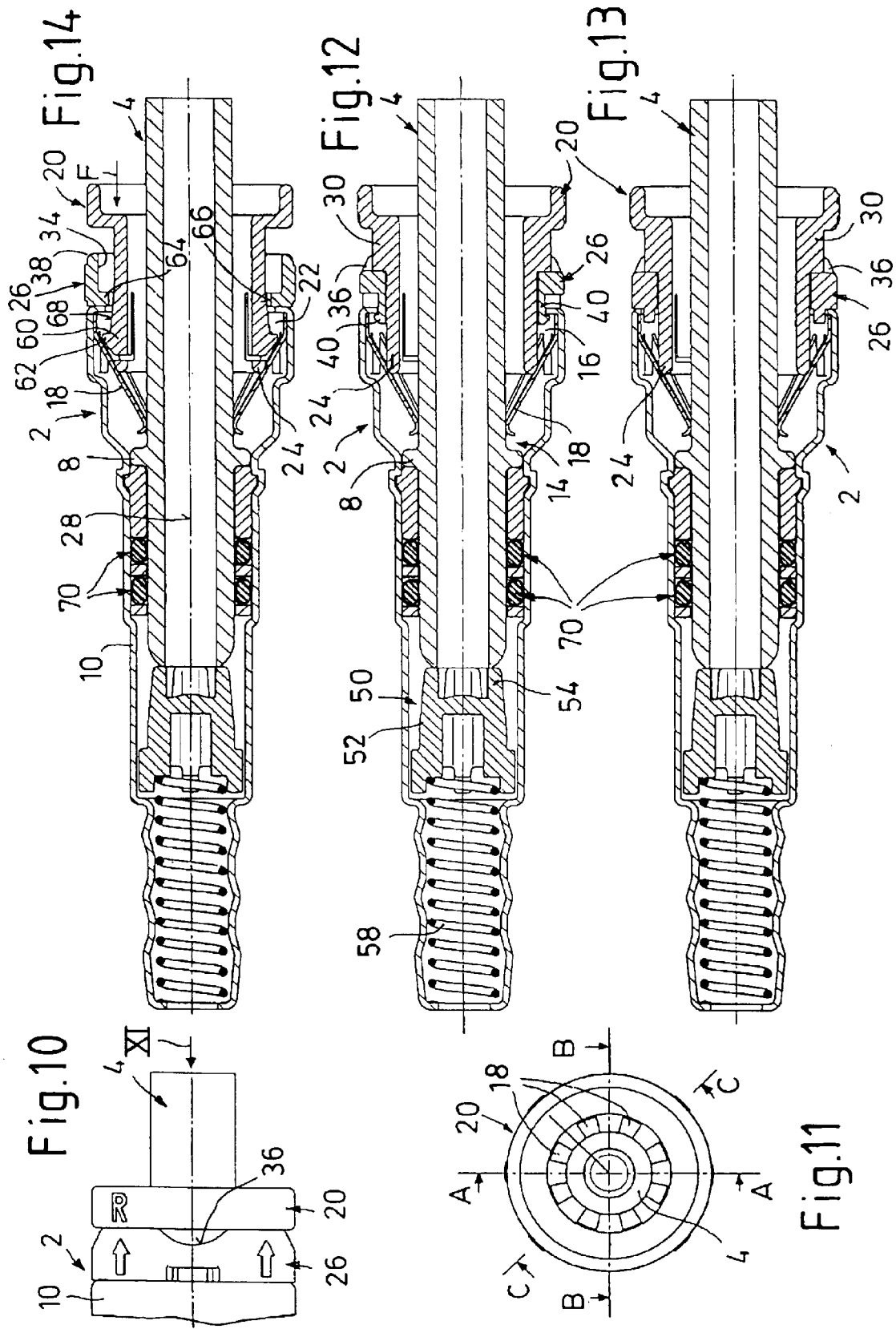

RECEIVING PART OF A FLUID PLUG-IN COUPLING

BACKGROUND OF THE INVENTION

1. Field of the Invention

The present invention relates to a receiving part of a fluid plug-in coupling "fluid" is to be understood as any hydraulic or gaseous flow medium, comprising a socket housing having a plug-in opening for a plug part and having a retaining device for releasable fixing the plugged-in plug part in place. The retaining device includes a retaining element that is mounted elastically deformable retaining sections for latching engagement behind a radial retaining step of the plug part. The retaining device also includes a release element which is secured in an axially displaced manner relative to the socket housing via latching means. The release element engages by means of an inner release section in the plug-in opening and, for release purposes, acts against the retaining sections of the retaining element.

2. Related Technology

EP 0 727 027 B1 describes a rapid-action coupling in which the release element comprises an inner sleeve and an outer sleeve. As a release section, the inner sleeve acts against the retaining sections of the retaining element. In this connection, the plug part may be released unintentionally under certain operating conditions, potentially causing the particular fluid to leak out.

SUMMARY OF THE INVENTION

One aspect of the present invention is to provide a receiving part of the mentioned type which has increased security against unintentional release and leakages.

According to the aspects of the invention, the increased security is achieved by a securing element provided such that the release element is blocked in a secured position against a release movement and is unblocked in an unblocked position for a release movement. This prevents unintentional release. On the contrary, for release purposes, the arrangement must first be transferred from the secured position into the unblocked position for the release element to be moved axially against the retaining sections of the retaining element.

In addition to this, an integrated blocking valve can advantageously be provided, which automatically closes in the decoupled state and is automatically opened by the plug part being plugged in. As a result, leakages are largely avoided in the decoupled state.

BRIEF DESCRIPTION OF THE DRAWINGS

The invention will be explained in greater detail with reference to preferred exemplary embodiments which are illustrated in the drawing, in which:

FIG. 1 shows a half section, the upper half, of a first embodiment of a receiving part having a plug part and a receiving part and embodying the principles of the present invention, the plug part being plugged in the blocked, FIG. 2 shows a half section, the corresponding lower half, of the receiving part having a release element in a release position for unblocking the plug part, FIG. 3 shows the half section shown in FIG. 2 with the plug part partially withdrawn from the release element, FIG. 7 shows the components shown in FIGS. 5 and 6 in a secured position, FIG. 8 shows the components shown In FIG. 7 in an unblocked position, FIG. 9 shows another embodiment of the receiving part embodying the principles of the present invention in a longitudinal section, the blocked position being illustrated in the upper half of the figure (FIG. 9a) and the release position being illustrated in the lower half (FIG. 9b), FIG. 10 shows a partial side view of the further embodiment of the plug-in coupling in the release position, FIG. 11 shows an end view in the arrow direction XI in FIG. 10, FIGS. 12 to 14 show longitudinal sections of the plug-in coupling in the blocked position, specifically FIG. 12 in the section plane A—A in FIG. 11, FIG. 13 in the section plane B—B in FIG. 11, and FIG. 14 in the section plane C—C in FIG. 11.

DETAILED DESCRIPTION OF THE INVENTION

Figure 4:
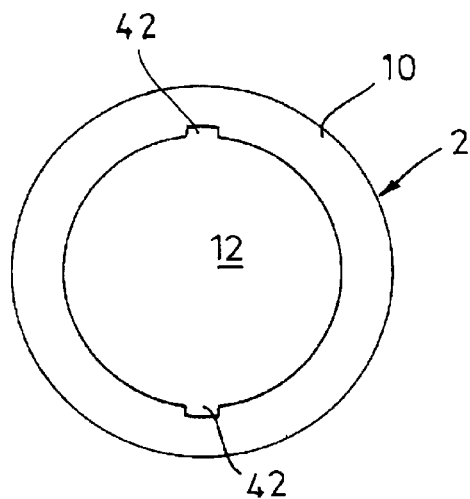
FIG. 4 shows an end view of the receiving part shown in FIGS. 1 and 2 taken along line IV—IV.
Figure 5:
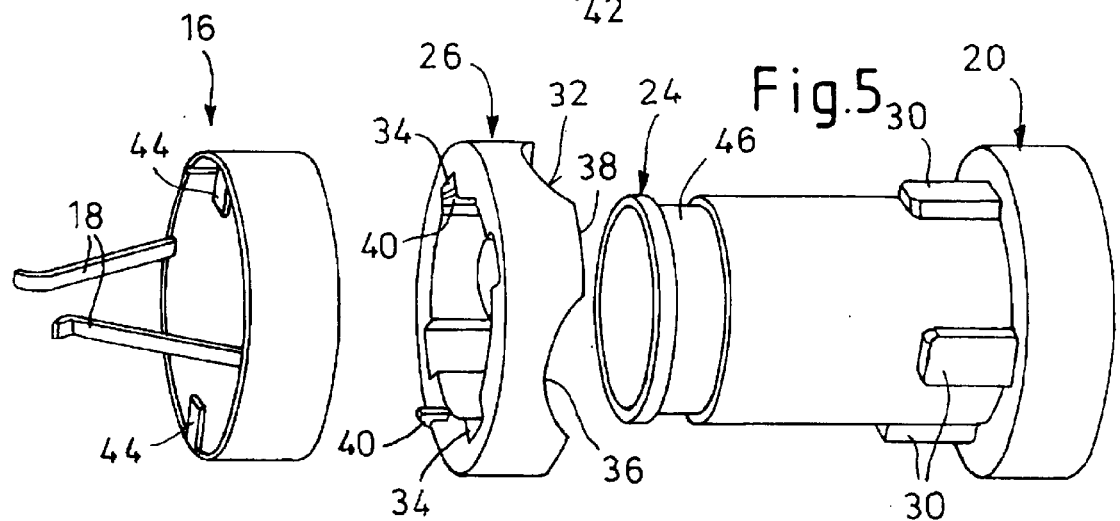
FIG. 5 shows a perspective exploded view of the release element, a retaining element and a securing element shown in FIGS. 1–4.
Figure 6:
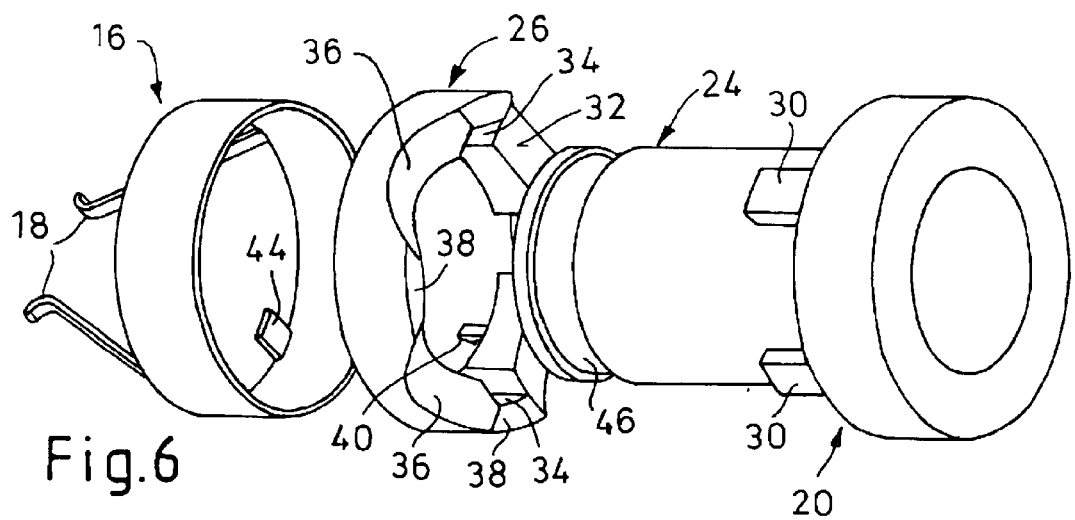
FIG. 6 is a perspective view of the components shown in FIG. 5 from a different viewing direction.

In the various figures of the drawings, identical parts are always provided with the same reference numbers.

As emerges initially from FIGS. 1 to 3 and also FIG. 9 and FIGS. 12 to 14 in each case, a plug-in coupling includes a receiving part 2 and a plug part 4. However, the invention relates particularly to the receiving part 2 while the plug part 4 has a standard design ("SAE plug") in the form of a section of pipe which has an annular projection 8 to form a radial retaining step 6 on its outer circumference.

The receiving part 2 comprises a socket housing 10 having a plug-in opening 12 for the plug part 4 and having a retaining device 14 for releasably fixing the plugged-in plug part 4 in place. For this purpose, the retaining device 14 has a retaining element 16 which is mounted in the socket housing 10, this retaining element 16 for its part having radially elastically deformable retaining section 18 for latching engagement behind the retaining step 6 of the plug part 4. A plurality of radially symmetrical retaining sections 18, for example eight retaining sections 18, are preferably provided (see FIG. 11), but only two of them are illustrated in each case in FIGS. 5 through 8. The receiving part 2 additionally has a release element 20 which is secured in an axially displaceable manner relative to the socket housing 10 via latching means 22. In this case, the release element 20 engages the retaining sections 18 of the retaining element 18 and causes the retaining sections to expand radially so as to unblock the plug part 4. More specifically, an inner re ease section 24 located within the plug-in opening 12 acts against the retaining sections 18 to release the blocked plug part 4. According to one embodiment of the invention, the receiving part 2 has a securing element 26 positioned such that the release element 20 is blocked In a securing secured position (FIGS. 1, 7, 9a and 12–14) preventing an axial release movement and is unblocked in an unblocked position (FIGS. 2, 3, 8, 9b and 10) permitting a release movement. The securing element 26 and the release element 20 are preferably rotatable about the coupling axis 28 relative to each other between the secured position and the unblocked position. The release section 24 of the release element 20 is preferably a hollow cylindrical inner sleeve. Additionally, the securing element 26 is a ring (or annular disk) coaxially surrounding the inner sleeve, arranged axially in front of the end side of the socket housing 10.

As shown in FIGS. 5 to 8, the release element 20 has at least one radial securing projection 30 on the outer circumference of the release section 24. More specifically, four radially symmetrical securing projections 30 are provided. Each each securing projection 30 resting on an end surface 32 of the securing element 26 in the securing position. The securing projections 30 can be guided axially through a corresponding radial recess 34 of the securing element 26 in the unblocked position. In this connection, it is furthermore advantageous if the end surface 32 of the securing element 26 has a wavy contour such that a bearing region for the associated securing projection 30 (in the secured position) is formed in the region of an axially recessed wave trough 36, and the axial recess for passing the securing projection 30 through (in the unblocked position) is formed in each case in the region of an axially raised wave crest 38.

The securing element 28 is preferably connected, such as latched, to the socket housing 10 in a manner secured against rotation. For this purpose, the securing secured element 26 preferably has at least two, axial latching arms 40 which engage in the socket housing 10 and engage behind an edge. According to FIG. 4, the socket housing 10 has recesses 42 on the end sides for the latching arms 40.

The release element 20 is preferably secured indirectly in the socket housing 10, specifically via the retaining element 16 in the embodiment according to FIGS. 1 to 8. For this purpose, the retaining element 16 has at least one, or as illustrated two, radial retaining arms 44 which are located in a retaining groove 46 formed on the outer circumference of the inner sleeve 24. The retaining groove 46 is dimensioned here in the axial direction to be of such a width that it permits the axial release movement of the release element 20 in spite of the retaining arms 44 being in engagement.

According to the invention, the receiving part 2 furthermore has an integrated blocking valve 50 which automatically closes the fluid passage in the decoupled state and opens by the plug part 4 when plugged in to the plug-in opening 12. The blocking valve 50 has an axially moveable valve element 52 according to FIGS. 1 to 3 and 9 with bearing section 54 for the plug part 4. The bearing section 54 is guided displaceable within the socket housing 10 to guide the plug part 4. For this purpose, the bearing section 54 is preferably substantially cylindrical and has an expanded holder 56 for a free end region of the plug part 4. As a result, in its state in which it is guided with a relatively low amount of clearance into the holder 56, the free end region of the plug part 4 is guided within the socket housing 10 via the bearing section 54. The blocking valve 50 is prestressed in the dosing direction by a valve spring 58.

A few more variant embodiments will be explained. Referring now to FIG. 9, another embodiment of the present invention will now be described. The release element 20 shown in FIG. 9 is latched onto the outside of the outer circumference socket housing 10.

In embodiment illustrated in FIGS. 10 to 14, the release element 20 is secured indirectly via the securing element 26. For this purpose, the release element 20 has at least two axially extending, diametrically opposite retaining arms 60 which are moveable in a resilient manner in the radial direction and have radially outwardly directed latching lugs 62 at their front ends, protruding into the receiving part 2. Reference is made in this respect in particular to FIG. 14.

The securing element 26 has a radially inward-pointing annular collar 64 with an inner bearing surface 66. The release element 20 can be latched to the latching lugs 62 of the retaining arms 60 through the annular collar 64. By bearing against the annular collar 64, the latching lugs 62 also serve to prevent the release element 20 from being pulled out. In addition, the release element 20 is acted upon by a spring for F, which acts axially in a release-actuating direction (see FIG. 14). In the embodiment illustrated, this is achieved by the resilient retaining arms 60 having outer, cone-like oblique surfaces 68, which interact radially with the inner bearing surface 66 of the annular collar 64 of the securing element 26 to produce the spring force F. The element 20 is thus constantly pulled Into the receiving part 2 by the spring force F, so that the securing projections 30 are always retained in the wave troughs 36 and can only be transferred counter to the spring force F into the region of the wave crests 38.

In the embodiment shown In FIGS. 10 to 14, the valve element 52 of the blocking valve 50 interacts in its closed position (not illustrated) with a sealing arrangement 70—in this example formed by two axially spaced apart sealing rings—which is also provided, in accordance with the illustration in the drawings, for sealing the plugged-in plug part 4.

As an alternative, the release element 20 may also be connected, in particular latched, to the retaining element 18 to prevent rotation therebetween.

The end contour of the securing element 26 with the recesses 34 may also be formed directly (integrally) on the socket housing 10, so that the socket housing 10 has at the same time the function of the securing element 26.

The retaining element 16 can have additional latching means for the axially resilient fastening of the release element 20. In addition, the retaining element 16 can have additional spring arms which additionally hold a sealing closing bushing (not illustrated).

A dirt seal 48 is advantageously provided which can be formed by a thin rubber disk which is inserted between the socket housing 10 and the securing element 26 and is matched on the inside to the contour of the plug part 4. In the embodiment according to FIG. 9, a sealing element 48 of this type can also be arranged axially in front of the end side of the socket housing 10. In the clearance between the inner sleeve 24 and the outer latching means 22 of the release element 20. However, this sealing element 48 accounts for the installation space for the securing element 26. Furthermore, a radial sealing lip can also be arranged directly on the release element in such a manner that it extends radially inward and rests on the circumference of the plug part 4.

The receiving part 2 according to the invention can be operated as follows:

a) Single-handed operation. For single-handed operation, either the securing element 26 or the release element 20 is fixed in place relative to the socket housing 10 to secure against rotation. Rotation of the release element or of the securing element causes the securing projections 30 to pass out of the stable position of equilibrium (wave trough) into a position in which the securing projections 30 can be aligned in the region of the wave crests with the recesses 34 and can thus be passed axially through them.

b) Two-handed operation. In this case, neither the securing element 26 nor the release element 20 is fixed in place relative to the socket housing 10 in a manner secured against rotation. The two elements therefore are held and moved manually during the relative rotation.

The block can be checked by a) the distance between the release element 20 and securing element 28, or b) optical features (for example colored identification) on the securing projections 30 and/or on the inner sleeve 24 of the release element 20.

It is therefore intended that the foregoing detailed description be regarded as illustrative rather than limiting, and that it be understood that it is the following claims, including all equivalents, that are intended to define the spirit and scope of this invention.

What is claimed is:

1. A receiving part of a plug-in coupling, comprising a socket housing having a plug-in opening for a plug part and having a retaining device for releasably fixing a plug part in a secured position, the retaining device having a retaining element which is mounted in the socket housing and has radially elastically deformable retaining sections for latching engagement behind a radial retaining step of the plug part in the secured position, and a release element that is secured in an axially displaceable manner relative to the socket housing via latching means, the release element engaging by means of an inner release section in the plug-in opening acting against the retaining sections of the retaining element, the retaining sections being selectively coupled with a securing element in such a manner that the release element is blocked in the secured position preventing a release movement and is unblocked in an unblocked position permitting a release movement.

2. The receiving part as claimed in claim 1, wherein the securing element and the release element are rotatatly moveable relative to each other about a coupling axis between the secured position and the unblocked position.

3. The receiving part as claimed in claim 2, wherein the release section of the release element is a hollow cylindrical inner sleeve and the securing element is a ring coaxially surrounding the inner sleeve.

4. The receiving part as claimed in claim 3, wherein the release element has at least one securing projection that rests on an end surface of the securing element in the secured position and can be guided axially through a corresponding recess of the securing element in the unblocked position.

5. The receiving part as claimed in claim 4, wherein the end surface of the securing element has a wavy contour in the direction of rotation such that a bearing region for the securing projection is formed in each case adjacent to an axially recessed wave trough and the recess for passing through the securing projection is formed in each case in the region of an axially raised wave crest.

6. The receiving part as claimed in claim 5, wherein the securing element rotationally latched to the socket housing.

7. The receiving part as claimed in claim 6, wherein the release element is indirectly secured in the socket housing by at least one of the retaining element and the securing element.

8. The receiving part as claimed in claim 7, wherein the retaining element has at least one radial retaining arm which is received in a retaining groove formed on the outer circumference of the inner sleeve.

9. The receiving part as claimed in claim 7, wherein the release element is acted upon by a spring force that acts axially in a release-actuating direction.

10. The receiving part as claimed in claim 9, wherein the release element has at least two axial retaining arms which are resilient in the radial direction and, with outer, cone-like oblique surfaces, interact radially with an inner bearing surface of the securing element to produce the axial spring force.

11. The receiving part as claimed in claim 10, wherein the bearing surface is part of a radially inwardly pointing annular collar of the securing element, end sides of the retaining arms of the release element preferably having latching lugs for preventing the release element from being pulled out, by bearing against the annular collar.

12. The receiving part as claimed in claim 11, further comprising an integrated blocking valve which automatically closes in a decoupled state and is opened by the plug part in a plugged in state.

13. The receiving part as claimed in claim 12, wherein the blocking valve includes a moveable valve element with a bearing section for the plug part.

14. The receiving part as claimed in claim 13, wherein the bearing section is formed and guided within the socket housing for guiding the plug part.

15. The receiving part as claimed in claim 14, wherein the bearing section is of cylindrical and has an expanded holder for a free end region of the plug part.

16. The receiving part as claimed in claim 13, wherein the valve element interacts in its closed position with a sealing arrangement which is also provided for sealing the plugged-in plug part.

* * * * *